US005807619A

United States Patent [19]

Freedman

[11] Patent Number: 5,807,619

[45] Date of Patent: Sep. 15, 1998

[54] LIFT-TAB FOR PEELABLE LABELS AND SURFACES

[75] Inventor: Melvin S. Freedman, Beachwood, Ohio

[73] Assignee: Avery Dennison Corporation, Pasadena, Calif.

[21] Appl. No.: 522,988

[22] Filed: Sep. 8, 1995

Related U.S. Application Data

[60] Division of Ser. No. 44,550, Apr. 15, 1993, Pat. No. 5,520,760, which is a continuation-in-part of Ser. No. 874,198, Apr. 24, 1992, abandoned.

[51] Int. Cl.[6] .......... B29D 22/00

[52] U.S. Cl. .......... 428/35.7; 428/36.9; 428/36.91; 428/36.92; 428/903.3; 215/1 C

[58] Field of Search .......... 428/35.7, 36.9, 428/36.91, 36.92, 903.3; 215/1 C

[56] References Cited

U.S. PATENT DOCUMENTS

| | | | |
|---|---|---|---|
| D. 269,154 | 5/1983 | Freedman et al. | D8/98 |
| 2,882,599 | 4/1959 | Martin | 30/294 |
| 4,081,309 | 3/1978 | Jenkins | 156/250 |
| 4,175,460 | 11/1979 | McPhail | 83/856 |
| 4,398,985 | 8/1983 | Eagon | 156/233 |
| 4,544,590 | 10/1985 | Egan | 428/40 |
| 4,599,253 | 7/1986 | Bree | 428/40 |
| 4,837,088 | 6/1989 | Freedman | 156/243 |
| 4,925,714 | 5/1990 | Freedman | 428/40 |

*Primary Examiner*—S. Mark Clardy
*Assistant Examiner*—Michael A. Williamson
*Attorney, Agent, or Firm*—Renner, Otto, Boisselle & Sklar

[57] ABSTRACT

Peelable labels or peelable multi-ply cover elements containing separation interfaces are provided with built-in starting tabs by pre-peeling in paths or swaths extending in the machine direction along the separation interfaces and then reassembling the separated surfaces in contiguous relationship and die-cutting the labels or cutting or perfing the cover elements.

11 Claims, 3 Drawing Sheets

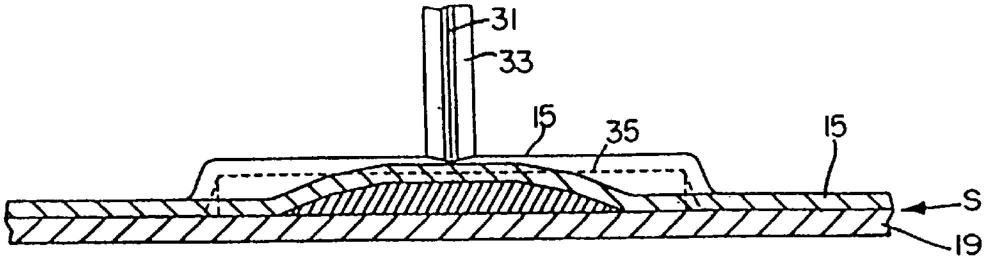
FIG. 6
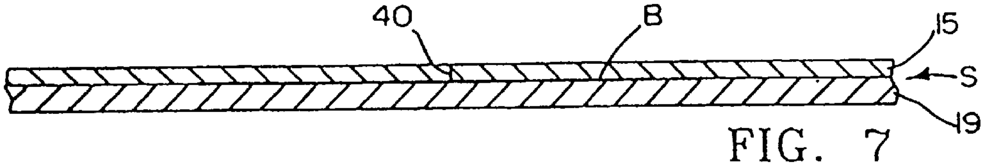
FIG. 7
FIG. 8
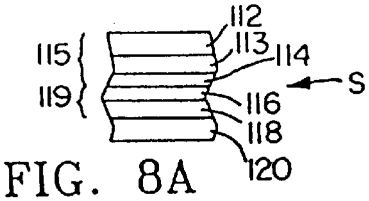
FIG. 8A
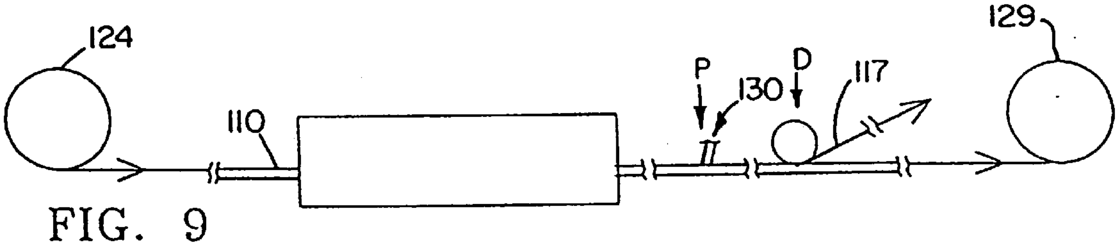
FIG. 9
FIG. 10A
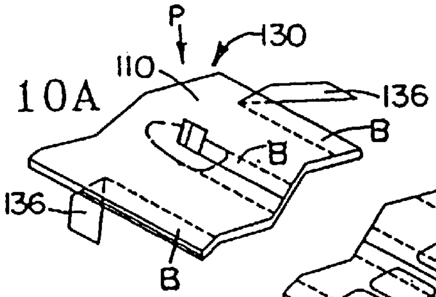
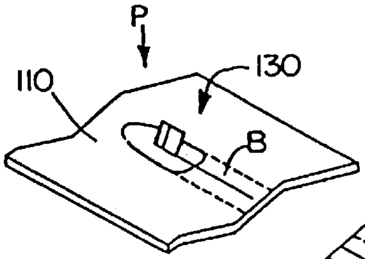
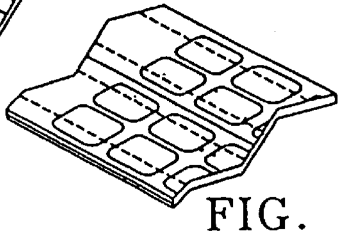
FIG. 10B
FIG. 9A
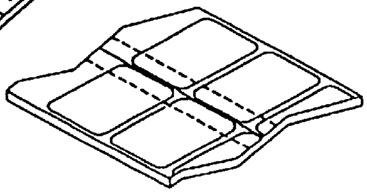
FIG. 9B
FIG. 9C

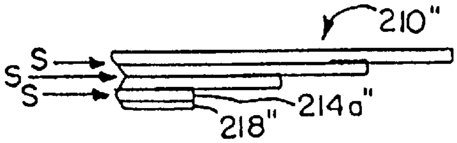
FIG. 15
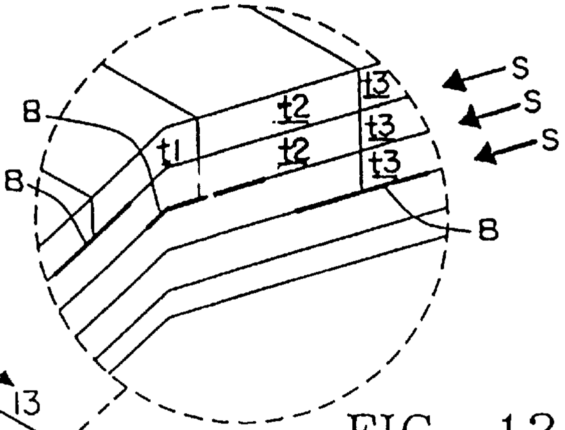
FIG. 12A
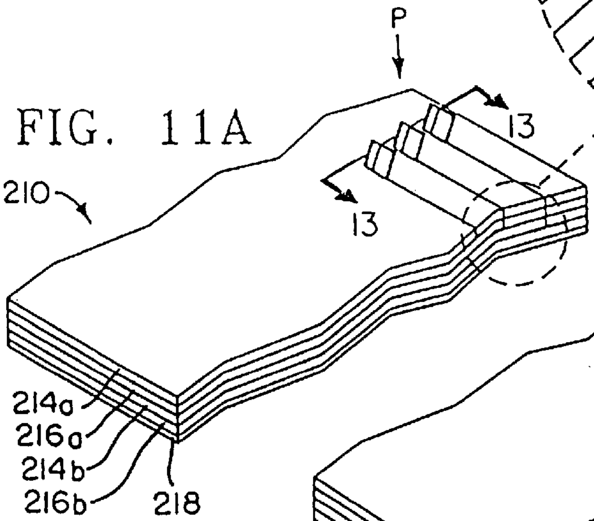
FIG. 11A
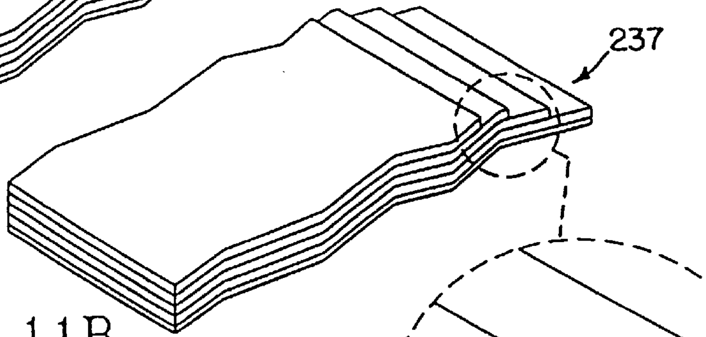
FIG. 11B
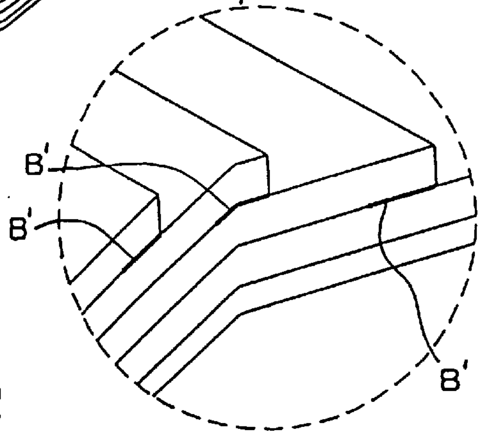
FIG. 12B
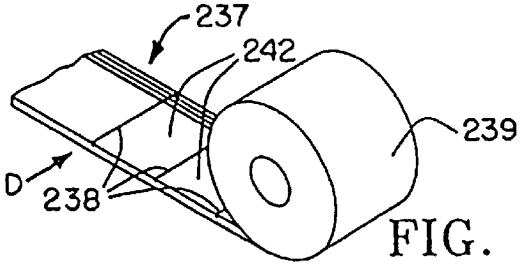
FIG. 11C
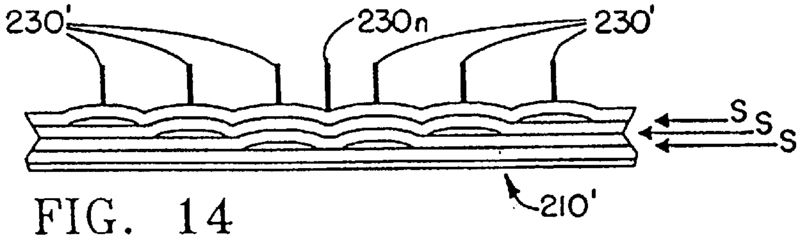
FIG. 14
FIG. 13
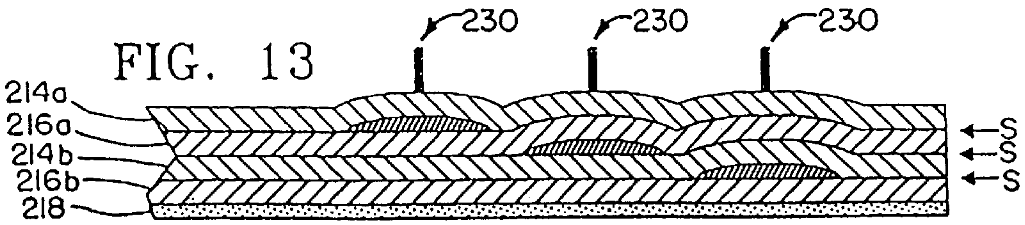

LIFT-TAB FOR PEELABLE LABELS AND SURFACES

This is a division of application Ser. No. 08/044,550, filed Apr. 15, 1993 now U.S. Pat. No. 5,520,760 which is a continuation-in-part of application Ser. No. 07/874,198 filed Apr. 24, 1992, now abandoned.

BACKGROUND OF THE INVENTION AND RELATED ART

This invention relates to peelable labels of the kinds intended to be peeled apart by the consumer or ultimate user, for example to remove contaminating inks so that labelled bottles or other containers can be efficiently recycled, or to remove non-sticky promotional redeemable coupons or the like forming the outer plies of facepieces of labels applied to consumer products. The first-mentioned kind of peelable labels may be referred to as peelable in-mold labels. The latter kind of peelable labels may be referred to as dry pick-off labels. ("Dry" refers to the fact that when the facepiece, such as a coupon, is removed from the label, neither side of the removed facepiece is sticky.)

The invention has application to in-mold labels having a bonded but peelable separation interface such as those disclosed in pending application of common assignee U.S. Ser. No. 07/839,369, filed Feb. 21, 1992, which in turn refers to pending application of common assignee U.S. Ser. No. 07/756,556 filed Sep. 9, 1991, now U.S. Pat. No. 5,242,650. The disclosure of U.S. Pat. No. 5,242,650 is incorporated by reference as if fully repeated herein. The invention also has application to pressure-sensitive labels having a peelable interface, such as the labels having "peelable interface 17" described in Freedman U.S. Pat. No. 4,837,088 to common assignee, and to "renewable surface" products having similar interfaces, also described in such patent, the disclosures of which are incorporated by reference as if fully repeated herein.

In labels and renewable surface products of these general types, there is a need to make the removal of the peel-off portion of the label or surface as convenient as possible, so that ease of use will tend to attract consumers to buy the labelled products, or renewable-surface products, in the expectation that recycling of the labelled container, or removal of the redemption coupon or the like, or renewal of the renewable surface, will be easily and conveniently accomplished. Starting the peeling action at the bonded separation interface can be difficult, particularly in the case of in-mold labels where the labels literally form an inlay in the container wall so that the front surface of the label is flush with the face of the container wall. Without a starting tab, in order to start the peeling action, the edge of the label must be pried or a blunt knife or similar tool must be pushed over the label edge with a smearing action while bearing down on the label. While dry pick-off labels do not generally similarly form an inlay in the container wall, if they do not have a starting tab they can still be difficult to separate at an edge in order to start the peeling action. The same is true of renewable-surface products.

SUMMARY OF THE INVENTION

The present invention provides a method of providing starting tabs for peelable in-mold labels, dry pick-off labels and peelable surfaces by simple means fully compatible with known manufacturing procedures for making label stock and converting it into individual labels. The present method combines with such procedures simple processing steps which may be performed at the converter level where individual labels are printed and die-cut from the label stock. The manufacture of tabbed labels in accordance with the invention can be carried out without use of additional materials, and the incremental cost of manufacture associated with providing the tabs can be extremely low.

The bonded but separable interface or "separation interface" of peelable in-mold labels may be formed by coextruding adjacent layers of unlike film-forming materials. The peelable interfaces of dry pick-off labels or peelable surfaces may be similarly formed, as described in U.S. Pat. No. 4,837,088 mentioned above. The molten extrudate freezes to form the desired peelable bond at the interface between the adjacent layers. A discovery of the present invention is that if this separation interface is peeled or separated along narrow paths or swaths extending in the machine direction, and the freshly separated facing surfaces are immediately brought back into contact together then, on the one hand, the film materials associated with the separated and then recontacted parts of the facing surfaces cling to each other in tight overlying relation and, on the other hand, these contacting film materials do not block or stick to each other, or at least not to a degree that interferes with their functioning as lift tabs after the label stock is die-cut into individual labels. Accordingly, the present invention contemplates provision of starting tabs by breaking the bond at the separation interface selectively along narrow paths or swaths in the machine direction, bringing the peeled-apart parts of the plies back together, and cutting the label stock into individual labels having edge portions corresponding to the narrow paths or swaths so as to provide tightly overlying but readily liftable starting tabs at such label edge portions.

Another concept of the invention in a preferred embodiment is to accomplish the formation of the narrow paths or swaths of separation by means which avoids working at the edges of the label stock and therefore avoids accompanying complications with respect to maintaining proper tracking and edge trim. In this preferred embodiment, such working at the edges may be avoided altogether by using a footed cutter or a plurality of footed cutters in the manner to be described. However, the invention may be less preferably practiced by working at the edges of the label stock to form the narrow paths or swaths of separation.

BRIEF DESCRIPTION OF THE DRAWINGS

The invention is more fully set forth in the following specific description and the accompanying drawings, in which:

FIGS. 5–7 are schematic cross sectional views taken on the planes of lines 5—5, 6—6 and 7—7 in FIGS. 2A or 2B.

FIG. 8 is a schematic showing of dry pick-off label stock which may be made and used in the practice of the invention, showing the two-ply construction and the peelable interface between the plies.

FIG. 8A shows the detailed layering of the dry pick-off label stock.

FIG. 9 is a representation of a another converting line, i.e. a printing, drying, die-cutting and take-up line which may be used in the method of the invention when the label stock includes a label carrier sheet, as with dry pick off labels where the base label adhesive is pressure-sensitive.

FIGS. 9A, 9B and 9C are isometric sketches corresponding to parts of FIG. 9.

FIGS. 10A and 10B are views similar to FIGS. 9A and 9B respectively showing a converting line in which selective peeling is also carried out at the edges of the label stock.

FIGS. 11A, 11B and 11C are isometric sketches showing several successive stages in the manufacture of "renewable surface" products according to the invention, FIG. 11C being on a smaller scale than that of FIGS. 11A and 11B.

FIGS. 12A and 12B are enlarged views of portions of the broken-out sections appearing in FIGS. 11A and 11B, as indicated by dashed lines in the drawings themselves.

FIG. 13 is a schematic cross-sectional view taken on the plane of line 13—13 in FIG. 11A, but showing only elements intersecting the plane of the view, and not elements or portions thereof that would appear behind the plane.

FIG. 14 is a view similar to FIG. 13 but on a reduced scale, showing a dual arrangement of footed cutters together with a central cutting blade.

FIG. 15 is a view on the same scale as FIG. 14 showing a multi-ply web for a "renewable surface" product in which the "flight" of stairs formed by the stepped edge of the multi-ply web is slanted inwardly from top to bottom rather than outwardly as in the previously illustrated "renewable surface" products.

DESCRIPTION OF THE PREFERRED EMBODIMENTS

Figure 1:
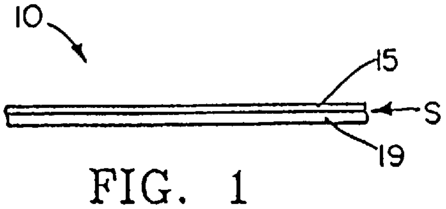
FIG. 1 is a schematic showing of in-mold label stock which may be made and used in the practice of the invention, showing the two-ply construction and the separation interface between the plies.
Figure 1A:
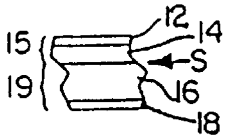
FIG. 1A shows the detailed layering of the in-mold label stock of FIG. 1, wherein each ply is multilayered.

The composite or layered label film material shown in FIG. 1 is a two-ply web 10 comprising the plies 15 and 19 joined at a separation interface S. The web 10 is made up of the coextruded layers 12, 14, 16 and 18 shown in FIG. 1A. Layer 12 is a printable facestock layer and layer 14 is one of the two layers defining the separation interface S. The layers 12 and 14 together comprise the multilayer first or peelable film face ply 15. Layer 16 is the other of the two layers defining the separation interface S. Layer 18 comprises a heat-activatable adhesive. The layers 16 and 18 together make up the multilayer second or non-peelable film ply 19. The plies 15 and 19 may also be referred to respectively as face ply and base ply. The coextruded label stock is preferably extruded, hot-stretched and annealed in the manner described in said U.S. Ser. No. 07/756,556, now U.S. Pat. No. 5,242,650 subject however to the significant difference that the distinct controlled separation interface is formed between coextruded plies. That is, the coextrusion is carried out with such materials and in such a manner as to define the separation interface S between layers 14 and 16. This separation interface is similar in character to the "peelable interface 17" of said U.S. Pat. No. 4,837,088. The intimately contacting layers 14 and 16 are of different composition, and the contacting surfaces of layers 14 and 16, that is to say, the pair of contacting interior faces of the first and second film plies 15 and 19, present to each other surfaces of different composition with a controlled degree of incompatibility at a pair of contacting interior faces joined at the separation interface S.

Consistently with the teaching of the foregoing copending applications, a preferable total thickness of the hot coextrudate for in-mold label application is about 20 mils before stretching, making a total thickness of about 4 mils following hot stretching at a five to one stretch ratio. Obviously, the thicknesses of the hot coextrudate, the degree of stretch, and the thicknesses in the stretched film may all be varied. Again consistently with the prior disclosures, in a presently preferred construction, the approximate thicknesses of layers 12, 14, 16 and 18 following stretching are respectively 0.5, 1, 2, and 0.5 mils, while the compositions of the layers by weight percentages are:

| | | |
|---|---|---|
| Layer 12 | polypropylene homopolymer | 50 |
| | ethylene-vinyl acetate copolymer | 50 |
| Layer 14 | polypropylene homopolymer | 100 |
| Layer 16 | polyethylene blend (see below) | 100 |
| Layer 18 | heat-activatable adhesive | 25 |
| | polypropylene homopolymer | 25 |
| | ethylene-vinyl acetate copolymer | 45 |
| | antistat | 5 |

The polyethylene blend referred to in the foregoing composition is a blend of low and higher density polyethylenes, the exact proportion of which depends on the best trade-off between factors such as flexibility, release, layer thickness and production speed for a particular application. Generally, a higher proportion of low density polyethylene favors easier release at the separation interface, and a higher proportion of higher density polyethylenes favors stiffness and enables thinner stock to be successfully die-cut and deployed and/or production speeds to increase. Preferred proportions of polyethylenes of different densities have not been determined as of the date of this application. However, as reflected in the formulation above, indications are that low density polyethylene is to be included and that higher density polyethylene (medium and/or high density) is to be blended therewith. The preferred proportion or proportions will be determined by routing testing. Nucleation by addition of fine particulate to the layer 16 may be used to enhance the degree of polymer crystallinity and increase the stiffness of the layer. In this manner, overall label thickness may be reduced and/or a label may be provided having first and second film plies of similar thicknesses, or even a relatively thinner ply 19, with the ply 19 being relatively stiffer.

The heat activatable adhesive is a proprietary product sold by H. B. Fuller of Blue Ash, Ohio under product number HM727, and comprises a blend of ethylene-vinyl acetate copolymer ("EVA"), polyethylene waxes and a tackifier effective to accomplish adhesion to HDPE. The adhesive by itself would be far too "watery" or low in viscosity to be successfully extruded, but it melt blends well with the EVA. The EVA stiffens up the extrudate, but is too sticky to process following extrusion, because it tends to stick to processing rolls with which it comes into contact while it is warm so as to damage the adhesive layer or laminate. The addition of polypropylene provides a skeletal backbone structure to give the extrudate excellent heat stability for hot-stretching and other processing.

The antistat is incorporated in the adhesive-containing charge (the charge for layer 18) and uniformly blended therewith. The amount of antistat used may be varied for particular formulations and processing conditions, the 5% amount used herein being typical. The antistat is efficiently used, since it may be added to the adhesive charge only. Thus, addition of antistat only to the adhesive-containing charge provides specificity and efficiency of use without the disadvantages of a topically applied antistat. In certain applications, it may be advantageous to also include the antistat in the central layer charge as well as the base layer charge, or in the central layer charge only.

In the particular adhesive layer composition described, the antistat used is sold by Hoechst Celanese under product number E1956 and is of the type that when added in bulk blooms to the surface and dissipates electrostatic charges by hydrophilic action which attracts extremely minute amounts of ambient moisture. Collection of moisture at the face layer, which may interfere with the label printing process, is avoided by adding the antistat to the adhesive layer only. Moisture collected at the adhesive layer surface does not interfere with adhesion of the label to the container in the in-mold labelling process. It is believed that the moisture is vaporized or dissipated by the elevated molding service temperatures, but in such small quantities as to not interfere with adhesion.

Figure 1B:
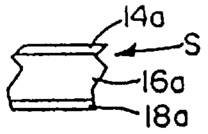
FIG. 1B shows the detailed layering of another in-mold label stock.

In the above-described label stock, the layer 12 functions essentially to render the label stock printable. In some instances, an acceptable alternative may be to omit the layer 12, as in the construction of FIG. 1B. In this construction, the layer 14*a* is directly exposed as the print-receiving surface which is rendered printable by corona treatment or the like in a known manner prior to the actual printing step. In such a construction, the first or peelable film ply may be a monolayer face ply consisting of the single layer 14*a*, and the composition of the layers 14*a*, 16*a* and 18*a* may be as described above for the layers 14, 16 and 18, but thicknesses may be 0.5, 2.5, and 0.5 for layers 14*a*, 16*a* and 18*a* respectively. The layers 16*a* and 18*a* together make up the multilayer second or non-peelable film ply. These first and second plies are essentially equivalent to the plies 15 and 19 so far as the conversion steps described below are concerned, and it will be understood that the description of these steps in connection with a label stock web having plies 15 and 19 can be understood to apply as well to a web comprising the first and second plies of FIG. 1B.

The presently preferred compositions of the layers of the face and base plies which define the separation interface comprise different polyolefins in amounts sufficient to yield the desired separation characteristics, the most preferred polyolefins presently being polyethylene and polypropylene homopolymers. These may be reversed from the order described above, for example with layer 14 comprising a polyethylene blend and layer 16 polypropylene homopolymer, but this is less preferable when labelling polyethylene bottles. It is notable that even with such reversal, suitable performance of the overall label construction, and particularly suitable compatibility with the ink-receptive layer and the adhesive layer, is achieved. The presently preferred composition of the printable facestock layer and the adhesive layer comprise blends of olefin polymers and copolymers of olefin monomers with ethylenically unsaturated carboxylic acid or ethylenically unsaturated carboxylic acid ester comonomers such as the ethylene-vinyl acetate copolymer. Thus, the multilayer face and base plies each include a layer of olefin polymers and a layer comprising a blend of olefin polymers and copolymers of olefin monomers with ethylenically unsaturated carboxylic acid or ethylenically unsaturated carboxylic acid ester comonomers such as the ethylene-vinyl acetate copolymer.

While in the above examples and descriptions, the thickness of the layer 16 or 16*a* is always greater than that of the layer 14 or 14*a*, and the thickness of the face ply is always greater than that of the base ply, such may not be the case is particular applications where it may be advantageous to reverse the relative thickness relationships of the layers or plies, or have them be of the same thickness.

Figure 2:
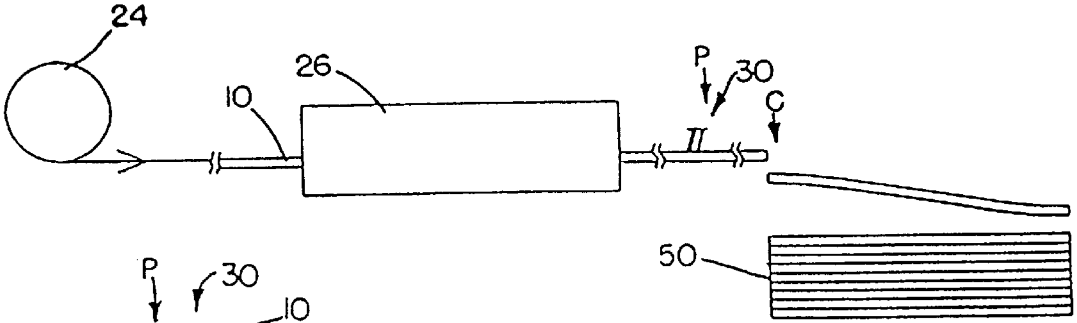
FIG. 2 is a representation of a converting line, i.e., a printing, drying, sheeting and stacking line used in the method of the invention.

The web layers combined as above to make up the label stock are processed according to the invention, as by a label converter, in the following manner. As schematically illustrated in FIG. 2, the coextruded, hot-stretched stock, which may be supplied in the form of the self-wound roll 24, may be printed or decorated in a printing press 26, and dried by heat, UV radiation, or the like. The printing or decoration may be covered with a protective lacquer if desired.

Figure 2A:
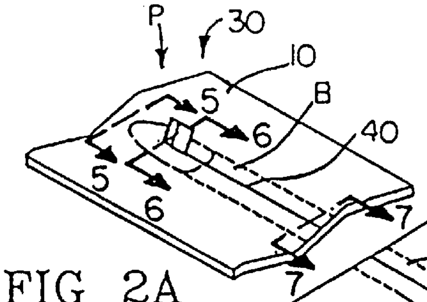
FIGS. 2A and 2B are isometric sketches corresponding to parts of FIG. 2.
Figure 4:
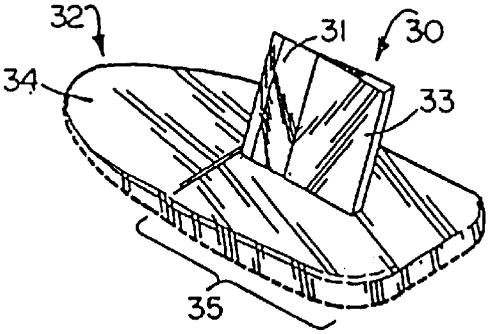
FIG. 4 is an enlarged sketch of the footed cutter seen in FIGS. 2 and 2A.

The printed and dried stock then passes to a peeling station P (FIGS. 2 and 2A). Here the plies are selectively peeled apart at the separation interface S along a machine direction to define a machine-direction swath or swaths (only one swath is illustrated in the illustrated embodiment) having a total width substantially less than the width of the two-ply web 10, so that the majority of the peelable interface remains unpeeled. The peeling is preferably accomplished by a footed cutter such as the cutter 30, best seen in FIG. 4, of a general type heretofore used as a safety cutter for "slabbing," that is, cutting unwanted spoilage from rolls of plastic web material without cutting the layers immediately underlying the spoilage layers. The operative elements of the cutter include the blade or cutter proper 31 and the foot 32 which, in the practice of the present invention, cleaves the separation interface S and acts as a peeler. The foot may be supported from above by a faired strut 33 which also serves as a holder and support for the blade. The strut 33 together with the blade 31 may in turn depend from and be supported by an overhead support frame or arm (not shown). The blade extends through only the top ply 15 of the web 10, and forms the slit 40 in the top ply. Preferably, the blade 31 is not perpendicular to the path of feed, but slants at a slight angle to perpendicular as it rises from the foot, as shown. The foot 32 is wedge-shaped and has a narrow blade-like leading end 34. The foot progressively widens and thickens or ramps up to a heel portion 35. The bottom of the foot is preferably parallel to web feed direction at the peeling station. Several parallel swaths may be formed in the web 10 by employing several footed cutters similar to the cutter 30.

Footed cutters heretofore used as safety cutters for "slabbing", but suitable to be mounted and used in the practice of the invention, can be obtained from a source for "slabber" cutters, namely The Spoilage Cutter Co., Green Bay, Wis. 54305. Their "Cutter No. 103" is one suitable form of cutter.

Figure 5:
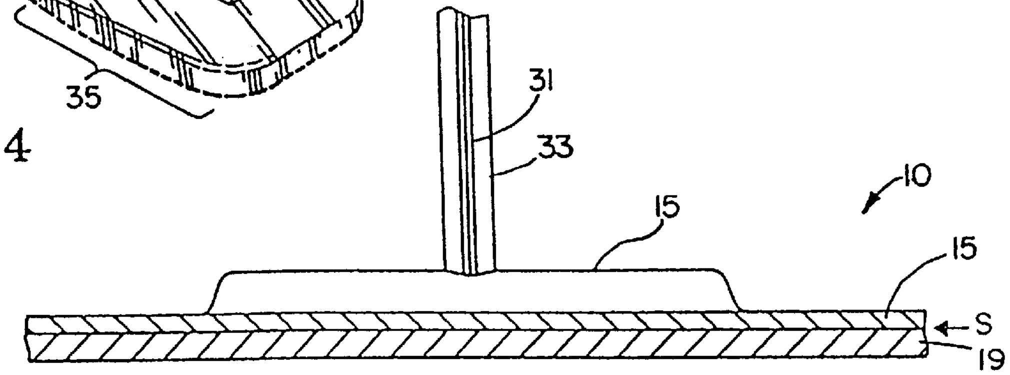

Seen in FIGS. 5, 6 and 7 are schematic fragmentary cross-sections of the parts taken at the locations where the web 10 approaches the footed cutter, passes it to form an unbonded swath B, and continues beyond it for further processing. The ply 15 is severed and experiences a degree of deflection and elongation as it passes the cutter and cutter foot, but then recovers back to substantially the same plane and dimension that it had prior to severing, as can be seen in FIG. 7, thereby re-establishing substantial contiguity of plies 15 and 19 at the unbonded swath B, i.e. re-establishing an absence of material distortion of the web material. However, although substantially contiguous, the plies are unbonded. This bringing-back-together is helped by the tendency of the ply 15 to recover its pre-cut shape due to its plastic memory and may be helped by passing the web around one or more rolls or between nip rolls (not shown).

The bringing-back-together may be completed by such means or its completion may be delayed until the stock is die-cut or otherwise subjected to other forces tending to bring the plies 15 and 19 together. In the illustrated embodiment, a rolling station (not shown) may be provided between the peeling station P and cutting station C (FIG. 2) to re-establish the substantial contiguousness of the plies prior to sheeting.

If the ply 15 is too severely deflected or elongated at the peeling station P, satisfactory recovery of the ply material will be precluded, and further satisfactory processing of the web 10 will be adversely affected due to bulging. Because of lack of sufficient flatness, it will not be possible to accomplish proper sheeting, or rewind of liner-carried labels, or insertion of labels into molds in the case of in-mold labelling, or label application to containers being labelled. The important consideration is that the degree of deformation which occurs as the web 10 passes the peeling station is limited sufficiently so as to not preclude recovery to the condition of substantial contiguity, that is, to the condition in which material distortion of the web material is absent to a sufficient degree that subsequent processing operations to which the stock is to be subjected, such as sheeting, winding, mold-insertion, or label application, can be satisfactorily carried out.

In the illustrated embodiment, the stock is then sheeted and stacked in a manner similar to that known for the sheeting of paper-based label stock. The web 10 is severed transversely at the cutting station. The severed rectangular sheets are collected to form the stack 50, each sheet of which contains at least one swath, such as the single swath B shown in the illustrated embodiment. The stack may contain 100, 200 or more sheets. For clarity of illustration, in the drawing the thickness of the sheets is greatly exaggerated and the stack 50 is therefore shown as being made up of only a relatively small number of sheets. Each sheet in the stack is intended to provide material for several individual labels to be die-cut from the sheeted material.

Figure 3:
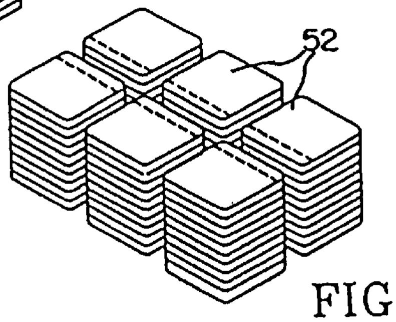
FIG. 3 is an isometric sketch illustrating processing of the stack produced by the line of FIG. 2.

In the illustrated embodiment, individual labels are formed in a known manner by hollow punches or cutting dies (not shown) which punch out stacks 52 of individual labels from the stack 50 of label stock. For example, the array of six stacks 52 of individual labels seen in FIG. 3 may be simultaneously punched out of the rectangular stack 50. Alternatively, the labels may be die cut by rotary or reciprocating means from a web without sheeting and then gathered into stacks. In either case, the die-cutting extends through both plies 15 and 19 and defines labels whose areas each have a minor edge portion intersecting a swath B and a major remaining portion outside of the swath B and containing unpeeled portions of separation interface S. Such minor edge portion of each label constitutes the starting tab of the label.

The stacks 52 of individual labels in the illustrated embodiment are stabilized by suitable wrapping or packaging (not shown) in a manner similar to that previously used with paper-based labels. The stabilized stacks 52 are then moved or transported to the site where they are to be applied to blow-molded bottles or other articles, which often is a different place than the site of label manufacture. The labels are then applied to blow-molded containers.

As pointed out in said U.S. Pat. No. 4,837,714, the interface peel strength at an interface such as the separation interface S is a function of several parameters, including among others, the identities of the two dissimilar polymeric layers, the presence and types of additives in one or both of the coextruded layers defining the interface, the presence or absence of pigments in one or both layers, the pressure exerted by, and the temperature of, the nip rollers, and thermal aging of the layers. While several factors can play a role in providing a desired peel strength, that desired peel strength can be achieved through routine trial and error adjustments. The peel strengths at the bonded portions of the separation interface S should be in the range of about 30–200 units, where the units represent grams per two-inch width at 90 degrees peel as measured on an Instron tensile tester at a peel speed of 12 inches per minute. Peel strengths in the range of about 50–150 are preferred, and more preferable are peel strengths in the range of about 55–75.

Peel strength at the separation interface is of course destroyed along the unbonded swaths B as the stock 10 passes the peeling station B, but the remaining bonded areas of the label stock 10, and therefore the majority of the areas of the labels die-cut therefrom as described above, have the peel strengths specified.

It is noteworthy that the starting tab edge portions of the labels to not block or stick to each other even under the heat and pressure experienced in blow-molding, or least not to a degree that interferes with their functioning as lift tabs. Peel strength at these edge portions may be re-established to some extent so that it is greater than zero, representing a low degree of cling tending to maintain the tight contiguousness between the layers, but is well below the peel strength at the bonded portions of the separation interface S. It is preferred that peel strength at the swaths B be no greater than 75 percent of peel strength at the bonded portions of the separation interface S, and more preferably no greater than 50 percent, and still more preferably no greater than 25 percent.

The composite or layered label stock shown in FIG. 8 is adapted for the manufacture of dry pick-off labels. It is a two-ply web 110 comprising the plies 115 and 119 joined at a separation interface S. The two-ply web is carried on a release liner 120. The web 110 is made up of the layers 112, 113, 114, 116 and 118 shown in FIG. 8A. Layer 118 is a pressure-sensitive adhesive directly carried on the release liner 120. Layer 112 is a printable facestock layer such as paper label stock or a printable film. Layer 14 is joined to the facestock layer by the layer 113 which is a suitable coated or coextruded adhesive. Layer 114 is one of the pair of layers defining the separation interface S. The layers 112–114 comprise the multilayer first or peelable face ply 115. Layer 116 is the other of the pair of layers defining the separation interface S, Layers 114 and 116 are preferably coextruded together and can be referred to as a coextruded core of the label stock construction. Layer 116 and adhesive layer 118 together comprise the multilayer second or base ply. The plies 115 and 119 may also be referred to respectively as face ply and base ply. The dry pick-off label stock may be formed in any of the ways described in aforesaid U.S. Pat. No. 4,837,088.

The coextruded core is preferably formed in the same manner as the core in aforesaid U.S. Pat. No. 4,837,088. That is, the coextrusion is carried out with such materials and in such a manner as to define a separation interface S between layers 114 and 116 similar in character to the "peelable interface 17" of said U.S. Pat. No. 4,837,088. The pair of contacting interior faces of the first and second film plies 115 and 119 present to each other surfaces of different composition with a controlled degree of incompatibility at a pair of contacting interior faces joined at the separation interface S.

The web layers combined as above to make up the label stock 110 may be processed according to the invention, as by a label converter, in a manner similar to that described above in connection with the manufacture of in-mold labels. The stock may be supplied to the label converter as a roll 124 (FIG. 9) of the two-ply label stock 110 combined with the release liner 120. As schematically illustrated in FIG. 9, the stock may be printed or decorated in a printing press 26, and dried by heat, UV radiation, or the like. The printing or decoration may be covered with a protective lacquer if desired.

The printed and dried stock then passes to a peeling station P (FIGS. 9 and 9A). Here the plies are selectively peeled apart at the separation interface S along a machine direction to define a machine-direction swath or swaths having a total width substantially less than the width of the web 110, so that the majority of the peelable interface remains unpeeled. Again, the peeling is preferably accomplished with a footed cutter or cutters, such as the cutter 130, similar to the footed cutter 30 previously described. One or more of such footed cutters may be used to form one or more unbonded swaths extending in the machine direction, such as the single swath B shown in FIGS. 9A–9C. The peeling apart and bringing-back-together of the plies 115 and 119 at the unbonded swath B is similar to that previously described. This bringing-back-together may be favored by the stiffness of the ply 115, particularly if the facestock layer 112 is paper, and may be helped by passing the web around one or more rolls or between nip rolls (not shown). The bringing-back-together may be completed by such means or its completion may be delayed until the stock is die-cut or otherwise subjected to other forces tending to bring the plies 115 and 119 together. In the illustrated embodiment, a rolling station (not shown) may be provided between the peeling station P and die-cutting station D (FIG. 9) to establish the tight contiguousness of the plies prior to die cutting As was the case with the ply 15 and the web 10 in the earlier embodiment, if the ply 115 is too severely deflected or elongated at the peeling station P, satisfactory recovery of the ply material will be precluded, and further satisfactory processing of the web 110 will be adversely affected due to bulging. Because of lack of sufficient flatness, it will not be possible to accomplish proper sheeting, or rewind of liner-carried labels, or label application to containers being labelled. Again, the important consideration is that the degree of deformation which occurs as the web 110 passes the peeling station is limited sufficiently so as to not preclude recovery to the condition of substantial contiguity, that is, to the condition in which material distortion of the web material is absent to a sufficient degree that subsequent processing operations to which the stock is to be subjected, such as sheeting, winding, or label application, can be satisfactorily carried out.

Next, labels may be die cut from the stock 110 at the die-cutting station. Using rotary cutting dies 125 or reciprocating dies or the like, the label stock 110 is kiss-cut into individual labels while leaving the carrier ply intact. For example, two rows of individual labels may be cut by the dies as seen in FIG. 9B. In either case, the die-cutting extends through both plies 115 and 119 and defines labels whose areas each have a minor edge portion intersecting a swath B and a major remaining portion outside of the swath B and containing unpeeled portions of separation interface S. Such minor edge portion of each label constitutes the starting tab of the dry peel-off portion of the label.

As shown schematically in FIG. 9 (but omitted from FIG. 9B for clarity), the matrix 117 of waste label stock resulting from the die-cutting of the labels is stripped from the carrier or liner 120, leaving behind the series of spaced labels supported on the intact continuous carrier, each label being provided with its own starting tab. The continuous carrier ply with labels thereon may be taken up as a roll 129 for shipment and storage if the label manufacturer and the label applier are at different sites, as is often the case.

Although it is preferable to use the footed cutter to form unbonded swaths, edge peelers may be employed to form unbonded swaths at the web edges. Thus as shown in FIG. 10A, edge peelers 136 consisting of peeling blades inserted between the plies 115 and 119 may be used to form unbonded swaths at the web edges. However, such working at the edges of the label stock presents problems with respect to maintaining proper web tracking and edge trim, and is preferably to be avoided. In the example shown in FIGS. 10A and 10B, a central footed cutter 130 is also employed so as to form a central unbonded swath B, in addition to the two edge swaths. The web is then die-cut by rotary dies in the pattern shown in FIG. 10B to provide four rows of tabbed labels. However, much the same pattern of four rows of tabbed labels could be provided by using two footed cutters each positioned roughly one third of the way inboard from one of the web edges, and the latter is a preferred procedure for the indicated pattern of labels.

Ranges for peel strengths at the bonded portions of the separation interface S and relative peel strength at the unbonded swaths B may be as previously described in connection with web 10.

Alternatively to the above described procedures in which the converter is supplied with the roll 124 of label stock 110 which has not yet been peeled to form the unbonded swath or swaths B, the forming of the swath or swaths B may be accomplished on the same line as the coextrusion or other combining of the plies 115 and 119 is performed by the manufacturer of the label stock 110, so that the swaths B are formed prior immediately subsequent to combining of the plies 115 and 119, or at least prior to printing and drying of the label stock. Or, the converter himself or herself may process the roll 124 by forming the swath or swaths B prior to printing and drying the stock. In either case, the forming of the swath or swaths may be accomplished substantially as described above, preferably with the use of a footed cutter, and printing, drying and die-cutting may then all be carried out after the forming of the swaths.

It is to be noted that the practice of the invention as described is fully compatible with procedures which are presently in general use in converting label stock into labels and in applying labels to containers and other substrates. As previously stated, the manufacture of tabbed labels in accordance with the invention can be carried out without use of additional materials, and the incremental cost of manufacture associated with providing the tabs can be extremely low.

The converting line shown in FIGS. 11A–C illustrates the practice of the invention in manufacturing "renewable surface" products which can be conveniently used. Such products consist of multi-ply cover elements which are adapted to be bonded to substrates such as dental trays and other articles and then peeled off one at a time. The invention provides such articles having convenient starting tabs for peeling off successive layers.

The stock for such products may comprise a multi-ply web 210. The web 210 includes several film layers, each of which may constitute a single-layer ply, such as the film layers 214*a*, 216*a*, 214*b*, 216*b* shown in the drawings. Each adjacent pair of these single-layer plies defines a separation interface S. These film layers are preferably formed by coextrusion. The number of coextruded layers may exceed four, but for convenience of illustration only four are shown in the drawings.

As disclosed in aforesaid U.S. Pat. No. 4,837,088 of common assignee, the films of each adjacent pair of layers defining a separation interface may be of different composition, with a given composition repeated for non-adjacent films, i.e., repeated every other layer. Thus as previously indicated for other embodiments of the invention, the presently preferred compositions for the layers of differing composition which define the separation interfaces comprise coextruded layers of different polyolefins, the layers differing sufficiently to yield the desired separation characteristics under the time, temperature and other conditions of coextrusion they experience when formed. Thus the layers 214*a* and 214*b* may be polyethylene or polyethylene blends, and the layers 216*a* and 216*b* may be polypropylene homopolymer.

The multilayer web 210 may be formed by coextrusion with or without hot stretching. Hot stretching may desireably increase tensile strength in the machine direction, and may also desireably stiffen webs that would otherwise be too limp to conveniently handle. The final thicknesses of the individual layers or plies following hot stretching, if any, or upon solidifying if hot stretching is not employed, are preferably uniform and may be from less than a mil to several mils, depending on application, and on peel strength of the film-to-film bonds at the separation interfaces. Thicknesses of as little as half a mil or less may be feasible in some circumstances where designed peel strength is relatively low, but generally thicknesses of a mil or more will be preferred. In applications where possible penetration by unsterile sharp medical implements may be a consideration, thicknesses of several mils or more may be used. Unnecessary thickness is to be avoided because of increased material costs. Other disadvantages of unnecessary thickness may include unwanted stiffness and lack of surface conformability, and reduced number of "renewals" available from one multi-ply cover element.

Theoretically, it might appear that the further toward the outer or upper portion of the construction a given interface is, the easier should be its peelability, so as to avoid premature peeling of lower layers when an outer layer is peeled off. Such progressive peelability may be desirable, and may be achieved by varying coextrusion temperature from top to bottom, by varying compositions throughout the layers of the web 210 rather than repeating a given composition every other layer, or by other means. In this connection, reference is again made to the earlier discussion herein of control of peel strength at a separation interface, and to U.S. Pat. No. 4,837,714 referred to in such earlier discussion, including the portions thereof relating to the achievement of such progressive peelability. However, presently such progressive peelability is not thought to be necessary because of peelback angle effects, as discussed below.

In general, desirable peel strengths are presently believed to be the same as those previously set forth, namely peel strengths of about 30–200 units, more preferably 50–150 units, and most preferably 55–75 units, where the units represent grams per two-inch width at 90 degrees peel as measured on an Instron tensile tester at a peel speed of 12 inches per minute. In any event, the strength of bond between the successive pairs of layers must be such as to withstand all separation forces imposed on the layers during the manufacture of the renewable surface products, such as during die-cutting, severing or perfing (perforating or weakening the web to form tear-off lines).

An additional layer, layer 218 in the drawings, is a suitable adhesive, preferably a pressure-sensitive adhesive in many applications, which has been combined with the other layers by direct coating, transfer coating, or any other suitable means, not excluding coextrusion. The adhesive layer or coating may be combined with the other layers at any time prior to the perfing or cutting of the stock 210 into individual cover elements, as referred to below. Generally, the adhesive layer will be provided by the manufacturer of the multi-ply web 210. The adhesive may be one of those pressure-sensitive adhesives described in said U.S. Pat. No. 4,837,088.

In the manufacture of peelable cover elements according to the invention, the pairs of adjacent plies defining the plurality of separation interfaces S are peeled apart in the machine direction at a peeling station P (FIG. 11A). The peeling is done by a plurality of footed cutters 230 similar to the cutters 30 and 130 previously described. The foot of each cutter is associated with its own separation interface S. The feet of the cutters form a plurality of unbonded swaths B (FIG. 12A) in the several separation interfaces S. The blade of the topmost foot cuts only through a single ply, the blade of the next-to-top foot cuts through two plies, the next lower foot's blade cuts through three plies, and so forth.

In the particular example illustrated in FIGS. 11–13, the cuts made by the blades of the footed cutters 230 define trim elements t1, t2 and t3 (FIG. 12A) which are then removed by suitable spooling means or the like (not shown). Such trim may be recycled. For purposes of recycling, the trim elements which make up multilayer trims may be removed layer by layer on separate spools. For example, the two trim elements t2 and the three trim elements t3 may each be separately spooled for later recycling with materials of their own kind. Spooling of the trim elements overcomes the strength of bond at the separation interfaces S to accomplish peeling and removal of the trim elements, and corresponding portions of the unbonded swaths B disappear, leaving remaining portions B' thereof underlying the now-stepped edges of the adjacent plies, as seen in FIG. 12B. The multi-ply web 210 now has a stepped edge 237 (FIG. 11C). This "flight" of steps will be seen to slant outwardly from top to bottom.

The bringing-back-together of the plies at such remaining portions B' of the unbonded swaths is similar to the bringing-back-together of unbonded swaths as previously described. Again, the bringing back together may be helped by passing the web around one or more rolls or between nip rolls (not shown) or by other means. The bringing-back-together may be delayed until the stock is later subjected to forces tending to bring the adjacent plies together. In the illustrated embodiment, a rolling station, not shown, may be provided between the stations shown in FIGS. 11A and 11B to establish the tight contiguousness of the plies.

As was the case with the formation of unbonded swaths in earlier embodiments, if the plies are too severely deflected or elongated at the peeling station P, satisfactory recovery of the ply material will be precluded, and further satisfactory processing of the web 210 will be adversely affected due to bulging. Because of lack of sufficient flatness, it will not be possible to accomplish proper rewind or sheeting, or proper application of peelable covers to substrates being covered. Again, the important consideration is that the degree of deformation which occurs as the web 210 passes the peeling station is limited sufficiently so as to not preclude recovery to the condition of substantial contiguity, that is, to the condition in which material distortion of the web material is absent to a sufficient degree that subsequent processing operations to which the stock is to be subjected can be satisfactorily carried out, and the final product be provided with lift tabs that are snugly and tidily in place.

The web 210 with its now stepped edge 237 may now be passed to a die-cutting or perfing station D (FIG. 11C) where perfs 238 may be formed to divide the web into a series of multi-ply cover elements or renewable surface products 242. These may still be joined at the perf lines, so that the series of cover elements 242 may be taken up as a roll 239. Alternatively, the elements 242 may be sheeted by being completely severed from each other (by butt-cutting the web) at the station D, and then being stacked in bundles for storage and handling, similarly to the sheeting operation seen in FIG. 2. In this case, the adhesive 218 may be designed to readily release from the material of the uppermost web ply 214*a*, or the uppermost ply may contain a release coating (not shown) so that individual cover elements 242 may be readily stripped from the bundle. As a further alternative, release liner (not shown) may be provided for the adhesive. Thus, a release liner (not shown) may be provided to transfer-coat the adhesive 218 onto the underside of the web 210, and the individual cover elements 242 may be formed as "labels" by die-cutting and matrix stripping similarly to the operations described in reference to FIG. 9. If desired, the resulting individual cover elements may thereafter be dispensed past a peel-back edge that strips the release liner and presents successive cover elements for use.

For medical applications, the cover pieces may be formed as sterile elements. Coextrusion of the melted plastic layers through a hot die in the manufacture of the multi-ply web 210 establishes sterile conditions at the separation interfaces S and maintains or "seals in" sterility until after the interfaces are opened. Coextrusion also establishes sterility initially at the top surface of the web. If sterile conditions of the top surface are not maintained during subsequent operations prior to takeup at the roll 239, or prior to sheeting, sterility of the top surface just prior to these operations may be re-established by irradiation or other treatment, to be thereafter maintained by the containment of the top surface within the roll or stack. Alternatively, sterility of the top layer may not be maintained or expected, and recommended use may include removing the top layer before relying on the sterility of the covering.

When one of the cover pieces is applied to a substrate such as a dental tray, the tray top thereby presents the sterile top layer of the cover, or the top layer is peeled off to present the sterile second layer. As the tray is re-used in successive procedures, successive layers are peeled off to present a newly sterile surface for each procedure until the lowermost ply is used, after which the lowermost ply together with the adhesive layer are peeled off the tray. A new cover piece is thereafter applied for subsequent tray use.

Each ply is peeled off by running the finger across the "step" surface that represents the same level as the separation interface to be opened, running it toward the "riser" or side edge of the ply that is to be removed. This causes the portion of the ply immediately above the associated remaining portion B' of unbonded swath to lift, providing a lift tab. With thumb and forefinger, this tab is then grasped and folded over to almost a 180 degree peel angle, or at least well in excess of 90 degrees, and the gripped ply is peeled off. The presence of the unbonded portion B' greatly assists in establishing the high angle of peel from the first moment that peeling against the full strength of the bond begins. In other words, even at the first moment that peeling proper begins, a high peel angle has been established. Under these high-peel-angle conditions, the tendency to peel at the desired separation interface will exceed the tendency to peel at lower interfaces even if respective peel strengths are comparable.

When it is desired to form the peripheries of the individual peelable cover elements other than as rectangles, for example when it is desired to form rounded corners to better match the configuration of items to be covered such as dental trays, surgical table covers or the like, the complete peripheries may be die-cut much as labels are die cut, or portions of the peripheries may be formed by a side edge of the web 210, with the remaining portions formed by die cutting. In many cases, the peelable cover elements will be cut to shape to match popular or standard sizes and shapes of trays or the like. In any case, care should be taken not to cut in such a way as to remove too much of the width of one or more of the laterally outermost plies of the stepped edge 237. To accommodate such die cutting, the footed cutters at the peeling station P may be positioned so as to deliberately exaggerate the width of the lowermost "step" of the edge 237, and the excess width may then be trimmed off during die cutting. It will be noted that in all these alternatives, the multi-ply web 210 is cut or perfed at least in the cross direction to separate it at least lengthwise, if not both lengthwise and widthwise, into individual cover elements.

Separation into individual cover elements can additionally occur widthwise if the cover elements are narrow enough and the multi-ply web is sufficiently wide. For example, two series of cover elements can be simultaneously formed by peeling and cutting at the lateral center of a web 210' as seen in FIG. 14. Here, the array of cutters 230' step downwardly and then upwardly again, and the web 210' is divided longitudinally into two webs by the central non-footed cutter blade 230*n*. As a result, two stepped edges are formed at the lateral center of the web 210', each similar to the stepped edge 237. The result is two constructions, one similar to that previously described and the other the mirror image thereof. These can be used to form two sets or series of cover elements, each set being taken up in a separate roll (not shown) similar to the roll 239, or sheeted into bundles separately from the other.

While cover elements as described above are all generally cut-to-shape products designed to match a definite shape of substrate, in some applications the end user may be provided with a roll of unperfed and uncut web 210 having the starting tabs of the invention, and the end user may then cut or tear the web to fit the applicable substrate, such as for example a wall or counter surface, or perhaps a surgical table or chair or the like, taking care to preserve the starting tabs at the one edge of the web.

The manufacture of multi-ply cover elements as described may be relatively readily performed in lines of commerce already established in the label industry, since the materials and manipulations involved are generally such as can be performed by label converters on label converting lines if supplied with a multi-ply web stock such as the web 210, and since the manufacture of such stock has much in common with the manufacture of label stock presently provided to label converters by label stock manufacturers.

Although the multi-ply cover products described have all involved single layer plies, it may be desirable under some circumstances to have one or more of the separating plies consist of more than one layer, although such is not presently preferred. Thus, for example, a plurality of plies could be made up each with a top layer of one material and a bottom layer of another, the intra-ply bonding of the two layers being promoted by an intermediate tie layer so as to maintain the structural integrity of each ply, but the layer materials being chosen so that when directly presented to each other, the face of one ply to the unlike face of another ply, in the absence of any tie layer, the desirable degree of inter-ply peel strength is established between them. In this circumstance, the multi-ply web could be made up of identical multilayer plies, the structural integrity of each ply being maintained by its tie layer, and the separation interfaces being established between the outer faces of each adjacent pair of plies.

In some applications, it may be preferable to form the stepped edge of the multi-ply web such that, as seen in FIG. 15, the "flight" of stairs is stepped inwardly from top to bottom, rather than outwardly as previously described. This may be done by replacing the adhesive layer 218 as seen in FIG. 13 by a similar layer 218" combined on the initially topmost ply 214*a*", performing peeling at the peeling station P to form unbonded swaths, and performing trim spooling and bringing-back-together, all as previously described, then inverting the multi-ply web construction to put the adhesive layer on the underside so that the ply corresponding to formerly topmost ply 214*a*" becomes the lowermost ply, and the "flight" of stairs at the staired edge of the multi-ply web is now stepped inwardly from top to bottom. The resulting web 210" is seen in FIG. 15, with the remaining portions of the unbonded swaths, shown heavily shaded, again defining unbonded or lightly bonded areas that greatly facilitate the initiation of peel-back proper at sharp peel angles near to 180 degrees or at least well over 90 degrees. The multi-ply web seen in FIG. 15 may be formed into individual cover pieces in the manners previously described. After such a cover piece is applied to a substrate, the topmost ply is removed simply by manually gripping its edge at the stepped edge of the multi-ply web and folding it sharply back to open the associated remaining portion B' and thereby establish a sharp peel angle before peeling proper begins. The same process is repeated to peel off successively lower layers.

When forming such inwardly stepped cover pieces, it may be preferable to perform perfing before inverting the web, so that the stepped edge can be supported on an flat anvil surface or the like (not shown) during perfing. When the web is perfed, it may be desireable to delay combining (transfer coating) of the adhesive layer until after perfing, so that the adhesive layer will not have to be penetrated during perfing.

While medical and dental applications requiring sterility have been emphasized, such as dental or surgical trays and surgical tables, other applications for renewable surface products exist, such as paint trays, lapboards, wall or counter surfaces, CRT screen covers and other substrates where renewability is desired.

It should be evident that this disclosure is by way of example and that various changes may be made by adding, modifying or eliminating details without departing from the fair scope of the teaching contained in this disclosure. For example, although it is presently preferred to create the separation interfaces S by coextrusion of unlike film materials, it may be possible in some instances to replicate the peelable interface by laminating unlike web materials together under heat and pressure, followed by selective peeling along a machine direction swath or swaths and the formation of tabs as disclosed herein, to provide an interface similar in character to the separation interfaces S referred to herein.

Figure 2B:
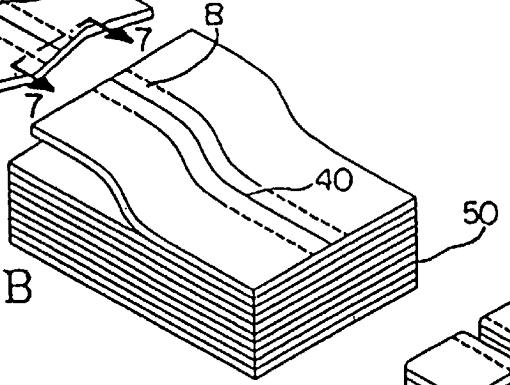

As further examples of the many possible variations in the practice of the invention, die-cutting of labels may be done directly by rotary or reciprocating means and such labels may then be gathered into individual stacks of labels, thus substituting a gathering step for the step of forming the stack 30. Alternatively, die cutting of labels may be done in-line with a label applying operation. Dry pick-off labels may be provided with tabs as disclosed herein by combining the forming of peelable swaths as presently disclosed with prior steps performed by the converter (label manufacturer) rather by than the manufacturer of the basic label stock, as for example the sequence described in connection with FIGS. 1A–1C of said U.S. Pat. No. 4,837,088 wherein the facestock layer 112 would be separately supplied to the converter and the printing and drying of the label stock 110 would include printing and drying the both sides of facestock 112 and then combining the facestock with the remainder of the label stock 110, or in connection with FIGS. 2A–2C of the same patent wherein the facestock layer 112 combined with the adhesive layer 113 would be separately supplied to the converter and the printing and drying of the label stock 110 would include not only printing and drying of the top side of facestock 112 but also printing and drying of the top side of layer 114 and then combining layers 112 and 113 with the remainder of the label stock. As previously indicated, the multi-ply peelable covers disclosed herein may not be cut or perfed into individual cover elements, but rather supplied in uncut rolls or sheets for tearing off or cutting by the end user to accommodate the particular end use.

The invention therefore should not be limited to particular details of this disclosure except to the extent that the following claims are necessarily so limited.

What is claimed is:

1. An article of manufacture comprising a blow-molded plastic container, a two-ply label adhesively bonded to the wall of said container, said plies each comprising one or more film layers, said plies being in contact with each other and presenting to each other surfaces of different composition at a pair of contacting interior faces joined at a separation interface, one of said plies comprising printable in-mold label facestock, the other of said plies comprising an adhesive bonding said ply to said container, said plies adhering to each other at said separation interface with a peel strength in the range of about 30 to 200 grams per two-inch width at 90 degrees peel throughout a majority of the area but less than all the area of said label, the peel strength between said plies along an edge area of said label at said separation interface being substantially less than the peel strength at said majority of the label area to thereby provide a starting tab for separation of the outer of said two plies.

2. An article of manufacture as in claim 1, said peel strength throughout a majority of said area being in the range of about 50 to 150 grams per two-inch width at 90 degrees peel.

3. An article of manufacture as in claim 1 said peel strength throughout a majority of said area being in the range of about 55 to 75 grams per two-inch width at 90 degrees peel.

4. An article of manufacture as in claim 1, said label with its starting tab being inlaid in the wall of said container.

5. An article of manufacture as in claim 1, wherein said surfaces of different composition are formed of different polyolefins.

6. An article of manufacture as in claim 1, wherein said surfaces of different composition are formed as a coextrudate of different polyolefins.

7. An article of manufacture as in claim 1, wherein said surfaces of different composition are formed of either polyethylene homopolymer or polypropylene homopolymer.

8. An article of manufacture as in claim 1, wherein at least one of said plies includes a plurality of film layers, said film layers including a layer of olefin polymer and a layer comprising a blend of olefin polymers and copolymers of olefin monomers with ethylenically unsaturated carboxylic acid or ethylenically unsaturated carboxylic acid ester comonomers such as the ethylene-vinyl acetate copolymer.

9. An article of manufacture comprising a flexible multiply web comprising a set of plastic-web plies, each pair of adjacent plies of the set having, between them, a corresponding pair of contacting faces peelably bonded to each other, whereby said pairs of contacting faces of said pairs of adjacent plies constitute peelable separation interfaces, said plies each comprising one or more film layers, said plies being in contact with each other and presenting to each other surfaces of different composition at said separation interfaces, said plies adhering to each other at said separation interfaces with peel strengths in the range of about 30 to 200 grams per two-inch width at 90 degrees peel throughout a majority of the area but less than all the area of each said separation interfaces, said separation interfaces having edge areas associated with a lateral edge of said multi-ply web, the peel strengths between said plies along said edge areas being substantially less than the peel strengths at each said majority of the label area, and an adhesive layer below the lowermost of said plastic-web plies.

10. An article as in claim 9 in which said lateral edge of said multi-ply web is stepped whereby, at said edge, one of each adjacent pair of plies extends laterally beyond the other.

11. An article as in claim 10, in which said multi-ply web is divided at least lengthwise into individual cover elements by cuts or perfs as least in the cross direction.

* * * * *